(No Model.)

J. F. CHASE.
VAPORIZER.

No. 492,979.  Patented Mar. 7, 1893.

Witnesses.
Victor J. Evans.
J. M. Copenhaver.

Inventor.
John F. Chase
By W. A. Redmond
Attorney.

UNITED STATES PATENT OFFICE.

JOHN F. CHASE, OF AUGUSTA, ASSIGNOR TO HIMSELF, AND WILLIAM H. STEVENS, OF PORTLAND, MAINE.

VAPORIZER.

SPECIFICATION forming part of Letters Patent No. 492,979, dated March 7, 1893.

Application filed September 28, 1892. Serial No. 447,097. (No model.)

*To all whom it may concern:*

Be it known that I, JOHN F. CHASE, a citizen of the United States, residing at Augusta, in the county of Kennebec and State of Maine, have invented certain new and useful Improvements in Vaporizers; and I do hereby declare the following to be a full, clear, and exact description of the invention, such as will enable others skilled in the art to which it appertains to make and use the same.

This invention relates generally to apparatus for purifying water, and particularly to the vaporizers for such apparatus, and it has for its object to provide a simple, cheap, and durable vaporizer, wherein the water will receive a primary purification prior to its conversion into vapor, and it consists in providing a catch basin within the water holding receptacle adapted to receive the result of the primary purification of the water, and in other details of construction and arrangements of parts as hereinafter fully decribed and claimed.

Figure 1:
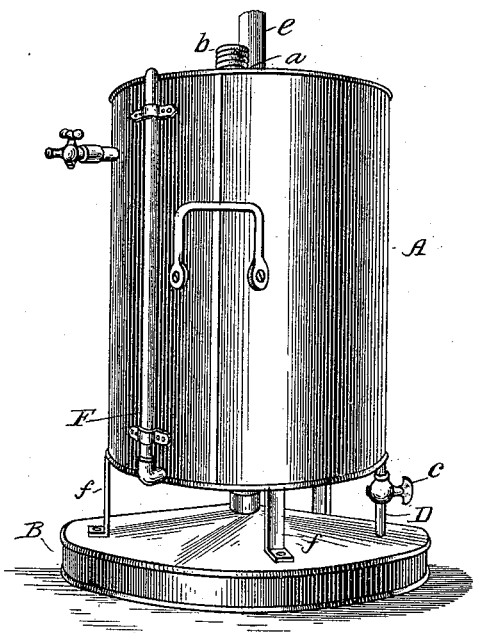
Figure 2:
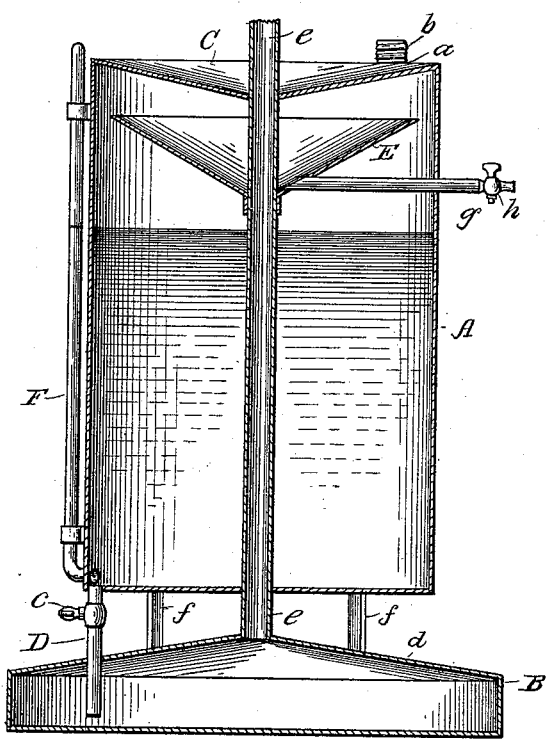

In the accompanying drawings forming a part of this specification—Figure 1 is a perspective view of the apparatus and Fig. 2 a vertical sectional view of the same.

Similar letters refer to similar parts in both views.

A represents a cylindrical vessel from which the water to be purified is fed to the steam generator B, said vessel having concave top C in which an inlet opening $a$ is formed through which the water is fed to the vessel and a screw cap $b$ is provided to close said opening air-tight. At the bottom of the vessel A an outlet pipe or tube D is secured to or over an opening in said bottom, said pipe being provided with a stop cock $c$ to regulate the discharge from said vessel. The tube or pipe D extends downwardly and through the top of the steam generator B to nearly the bottom of said steam generator so that it empties at a point adjacent the bottom of the generator. The generator is a flat or shallow vessel having a convex top $d$ from the apex of which a pipe $e$ projects upwardly through the center of the bottom of vessel A and through the latter and out at its top and may be led to any suitable condensing apparatus. The vessel A is supported by legs $f$ at a short distance above the generator B. Within the vessel A a flaring basin or pan E is arranged centrally about the pipe $e$ and is supported thereby at a point near the top of the vessel A in such position as to catch the results of the primary purification of the water. A pipe $g$ opens at one end into the basin or pan and extends through the wall of the vessel A and is provided with a stop cock $h$ whereby the contents of the pan may be drawn off when desired.

F represents a tubular glass gage arranged on the vessel A.

In operation the vessel A is filled with water to a point below the bottom of the pan E and the vaporizer placed on a stove, the stop cock $c$ opened, thus permitting a flow of water into the generator B which continues until the bottom is covered to the height of the end of the pipe D when the cock is closed until the water reaches the boiling point when the cock is again opened and permitted to remain open so long as the vaporizer is in use. Owing to the proximity of the vessel A to the source of heat and also the passage therethrough of the pipe $e$ the water contained therein becomes heated and any ammonia or other alkalies impregnating the water are released and in the form of a vapor ascend to the top of the vessel and, condensing thereon, trickle or flow down the inclined inner surface of said top and into the pan E thereunder from which they may be drawn off through the pipe $g$. The heat generated in the vessel creates a partial vacuum therein thus relieving the water therein of pressure and permitting the cock $c$ to remain open during the operation of the vaporizer and to feed into vessel B only sufficient water to replace that which has been converted into steam and is escaping through the pipe $e$ to the condenser.

It will thus be observed that this construction and arrangement of the vaporizer is such that the steam may be generated therein very quickly and freely escape therefrom, while the water, partly purified, is fed thereto in a heated state and only in sufficient quantity to replace that which has been converted into steam and that the ammonia or other alkalies liberated from the water may be readily withdrawn as desired.

Having thus described my invention, what I claim as new, and desire to secure by Letters Patent, is—

1. A vaporizer for condensing apparatus, consisting of a cylindrical vessel A having a concaved top, an inlet therein, an outlet pipe at the bottom, a shallow steam generating vessel, a pipe leading vertically therefrom and through the said cylindrical vessel, a basin or pan surrounding the upper part of said pipe within the vessel A and a discharge pipe leading from said pan, substantially as described.

2. In a vaporizer for condensing apparatus, the combination with a vessel having a concave top, and a steam pipe extending centrally through said vessel, of a basin or pan surrounding said pipe within the vessel, and a discharge pipe leading from said pan to the exterior of the vessel, substantially as described.

In testimony whereof I affix my signature in presence of two witnesses.

JOHN F. CHASE.

Witnesses:
W. H. BARNES,
D. F. WEAVER.